United States Patent [19]
Vig et al.

[11] Patent Number: 5,442,283
[45] Date of Patent: Aug. 15, 1995

[54] HALL-VOLTAGE SLOPE-ACTIVATED SENSOR

[75] Inventors: Ravi Vig, Concord, N.H.; Hitoshi Yabusaki, Tokyo, Japan; Alberto Bilotti, Argentina, Fla.

[73] Assignee: Allegro Microsystems, Inc., Worcester, Mass.

[21] Appl. No.: 117,516

[22] Filed: Sep. 3, 1993

[51] Int. Cl.$^6$ .................. G01R 33/06; G01B 7/14; H03K 5/22
[52] U.S. Cl. .................. 324/207.2; 324/251; 324/174; 324/207.25; 327/511; 307/116
[58] Field of Search ......... 324/207.20, 207.11–207.13, 324/207.21, 225, 235, 251, 252, 117 H, 173, 174, 207.26, 207.25; 307/309, 278, 263, 264, 494; 338/32 H, 32 R; 360/113, 112; 330/6, 310; 327/511; 333/172

[56] References Cited
U.S. PATENT DOCUMENTS

| | | | |
|---|---|---|---|
| 4,185,265 | 1/1980 | Griffin et al. | 324/251 X |
| 4,218,659 | 8/1980 | Arai | 330/6 |
| 4,687,994 | 8/1987 | Fulkerson et al. | 307/309 |
| 4,761,569 | 8/1988 | Higgs | 327/511 X |
| 4,914,387 | 4/1990 | Santos | 324/252 X |
| 4,982,155 | 1/1991 | Ramsden | 324/207.2 |
| 5,015,878 | 5/1991 | Lasagna et al. | 307/309 X |
| 5,045,920 | 9/1991 | Vig et al. | 324/251 X |
| 5,241,270 | 8/1993 | Ng | 324/251 |

Primary Examiner—Sandra L. O'Shea
Assistant Examiner—Jay M. Patidar

[57] ABSTRACT

The Hall sensor circuit includes a Hall element that is preferably followed by a Hall-voltage amplifier, and a pole end of a magnet is preferably fixed adjacent to the Hall element. The amplifier output is connected directly to one of a pair of differential inputs of a Schmitt trigger circuit and is also connected, via a single or a dual-polarity track and hold circuit, to the other of the differential Schmitt inputs. The dual-polarity track and hold circuit causes the voltage across a capacitor to track positive and negative Hall voltage slopes, and to hold the positive-going peaks and negative-going peaks of the Hall voltage presented to the fore-mentioned other Schmitt input so that when the difference voltage between the Hall voltage and the held voltage of the capacitor exceeds a positive or negative threshold of the Schmitt circuit, the Schmitt circuit output changes binary state indicating the approaching edge or the receding edge of a ferrous-gear tooth. The dual-polarity track and hold circuit is made up of two complementary plus and a minus peak detector circuits, each including a bipolar transistor having an emitter connected to the voltage-holding capacitor, an operational amplifier with an output connected to the base of the transistor, the amplifier having a negative input connected to the transistor emitter and a positive input serving as the input of the each Hall voltage tracking and holding circuit.

10 Claims, 7 Drawing Sheets

HALL-VOLTAGE SLOPE-ACTIVATED SENSOR

BACKGROUND

This invention relates to a Hall proximity detector, and especially to a Hall ferrous-gear-tooth sensor with an attached magnet capable of detecting the near presence of each tooth of an adjacent rotating ferrous gear, and more particularly relates to such a Hall sensor capable of detecting the leading and trailing edge of each passing tooth while being insensitive to DC components of the Hall signal within the sensor circuit including that caused by the magnet and those attributable to DC offsets in the Hall element(s) and the Hall-signal amplifiers.

It is known to provide a Hall sensor circuit that detects a passing magnetic or a ferromagnetic article wherein the amplified Hall signal is amplified and then filtered by an AC coupling means such as a high-pass filter to remove the DC component of the Hall signal. Removal of the DC component is especially necessary when a magnet is attached to the Hall sensor to provide a magnetic field that will be distorted when a ferrous article passes by the sensor, which distortion is to be sensed by the Hall sensor.

A number of such AC-coupled Hall sensors are disclosed in the patent U.S. Pat. No. 4,218,659, issued Aug. 19, 1980. Another such AC-coupled Hall sensor employs a differential high-pass filter having but one filter capacitor in the Hall-signal path, and is described in the patent to Ramsden U.S. Pat. No. 4,982,155, issued Jan. 1, 1991 and assigned to the same assignee as is the present invention.

These Hall sensors with high pass filters tend to produce a false triggering and false output when the power is turned on, because the filter capacitor(s) must charge to the appropriate DC level before normal operation can proceed. What DC level is appropriate cannot be sensed, e.g. because at power up it is not known whether the Hall signal level first existing is attributable to peaks, i.e. a tooth or valley, of the gear or how much of the first seen signal level reflects amplifier off-set. There are no known supplementary power-up fast-charge circuits that will solve this problem.

Further, the voltage of the high pass filter capacitor during sensor operation at low frequencies will decay tending to cause the sensor circuit to false trigger. It is much preferred that a sensor fail to produce an output at all, rather than to produce a false output.

It is an object of this invention to provide a Hall sensor that overcomes the above-noted short comings of the prior art.

It is another object of this invention to provide an improved Hall sensor for detecting the leading and falling edges of the Hall voltage signal employing a Hall-signal track-and-hold circuit by sensing the occurrence of a Hall-signal pulse slope or peak wherein the DC component of the Hall voltage is ignored, the off-sets of Hall element(s) and Hall signal amplifiers are ignored, and only one small Hall-signal-modifying capacitor is employed.

It is a further object of this invention to provide such a sensor wherein the capacitance of the small capacitor is many times smaller than needed in the prior art capacitor(s) in the Hall-signal-modifying path of the track-and-hold circuit, for a given low frequency gear-tooth-counting cut-off point, e.g. a given minimum gear-tooth passing rate.

SUMMARY OF THE INVENTION

A Hall-voltage slope-activated sensor includes a Hall detector and a comparator means having a differential pair of input conductors for producing an output pulse at the comparator output when the magnitude of the voltage appearing between the differential input conductors of the comparator exceeds a predetermined value. The term "Hall detector" as used herein is meant to include one or more Individual Hall elements and Hall-signal amplifiers serving to produce a Hall voltage. The comparator may be comprised of a Schmitt trigger circuit.

A first circuit branch means is connected between the output of the Hall element and one comparator input conductor for applying Hall voltage to the one comparator input conductor. A second circuit branch means, is connected between the Hall element output and another of the comparator input conductors for tracking the positive and negative slopes and holding the positive-going and negative-going peaks of the Hall voltage, and for applying the held voltage to the another comparator input conductor.

The second circuit branch means is connected between the Hall detector output and the other comparator input conductor, for tracking at least the positive slope and holding the subsequent positive-going peak of the Hall voltage at the detector output.

However it is greatly preferable, e.g. when the Hall sensor is to be used as a gear tooth sensor, that the second branch be connected between the Hall detector output and the other comparator input conductor and that it be comprised of a symmetrical-dual-polarity track and hold circuit including a plus Hall-voltage tracking and holding circuit means having a single voltage-holding capacitor for tracking positive slopes and holding the positive-going peaks of the Hall voltage, and a minus Hall-voltage tracking and holding circuit means for tracking negative slopes and holding negative-going peaks of the Hall voltage.

The plus and minus Hall-voltage tracking and holding circuit means are preferably each comprised of a bipolar transistor having an emitter connected to the voltage-holding capacitor, an operational amplifier with an output connected to the base of the transistor, the amplifier having a negative input connected to the transistor emitter and a positive input connected to the transistor collector and serving as the input of the each Hall voltage tracking and holding circuit.

The comparator may be a symmetrical-dual-polarity Schmitt trigger circuit having operate and release voltages of opposite polarities and equal value, namely the predetermined value.

Furthermore, the differential comparator following the track and hold circuit operates indifferently to even that DC level because it responds to the difference between the Hall voltage connected to one input and the holding capacitor voltage connected to the other input. It functions so as to ignore the DC content of the Hall voltage.

The Hall sensor of this invention is suitable for use as a ferrous article proximity detector, and is especially suitable for use as a ferrous gear-tooth sensor; in both cases the Hall sensor is formed in an integrated circuit and includes a magnet having a pole end attached to the integrated circuit. In general, the Hall-element output voltage waveform of prior art Hall gear tooth sensors with attached magnet has the profile of the gear teeth. This is also true of Hall sensors of this invention. But contrary to sensors of the prior art wherein at least a portion of the Hall signal is amplified and used to trigger a Schmitt trigger circuit or other comparator, the circuit of this invention employs a track and hold means which more precisely detects the onset and the termination of Hall-signal slope, e.g. corresponding to the approach and recession of a gear tooth. And, the required capacitance and size of the single holding capacitor in the sensor of this invention is much smaller than those required for the AC coupled Hall sensors of the prior art.

BRIEF DESCRIPTION OF THE DRAWINGS

FIG. 18 shows a graph of output voltage (Vout) in the Hall sensor of FIG. 13 as a function of angular rotation of the gear of FIG. 14. The five FIGS. 14 through 18 are drawn to the same horizontal scale.

DESCRIPTION OF PREFERRED EMBODIMENTS

Figure 1:
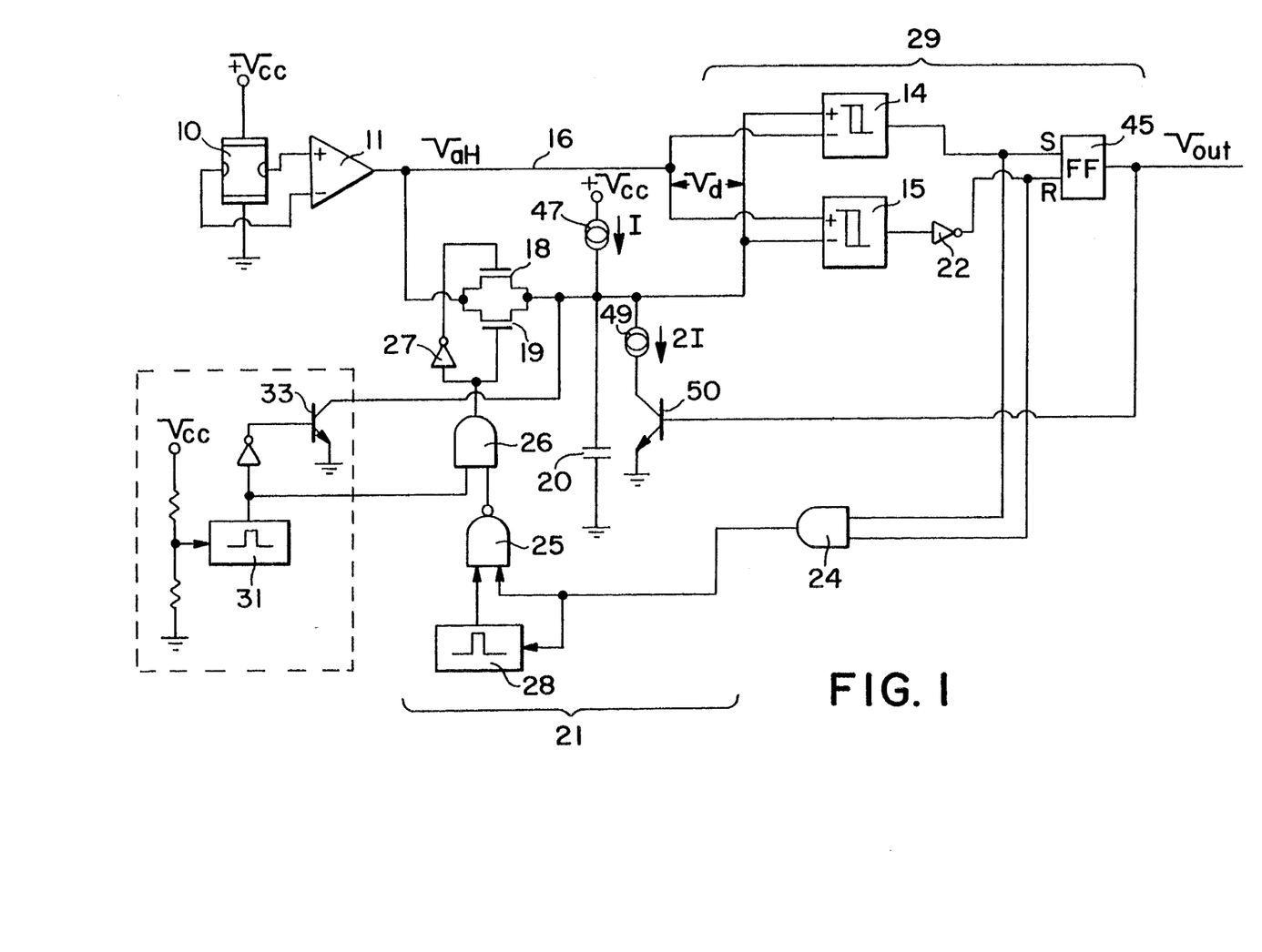
FIG. 1 shows a circuit diagram of a first slope-activated Hall sensor of this invention.

Referring to FIG. 1, the Hall element 10 has an output connected to the input of a Hall-signal amplifier 11. The amplified Hall signal $V_a$ H is connected directly to the "minus" input terminals of the two essentially identical Schmitt trigger circuits 14 and 15 via the upper circuit branch 16, and is connected to the "plus" input terminals of the two Schmitt trigger circuits 14 and 15 via the lower circuit branch that includes the FET switches 18 and 19 and the voltage-holding capacitor 20. The lower branch functions as a symmetrical dual-polarity track and hold circuit 21, which further includes a feedback circuit from the outputs of the Schmitt trigger circuits 14 and 15 composed of the invertor 22, the AND gates 24, and 26, the NAND gate 25, the invertor 27, and the one-shot circuit 28.

The Hall voltage $V_{aH}$ is at a steady non-changing non-zero value, occurring during intervals L and H as indicated in the time scale of FIGS. 4, 5, 6, and 7. The track and hold circuit with feedback from the dual Schmitt trigger circuits 14 and 15 produces a short output pulse each time the Hall signal rises (or falls) to a value at the "minus" input terminals of one of the circuits 14 and 15 that is greater than the held voltage on holding capacitor 20, by an amount equal to the threshold voltages of the composite symmetrical differential Schmitt trigger circuit 29.

Figure 3:
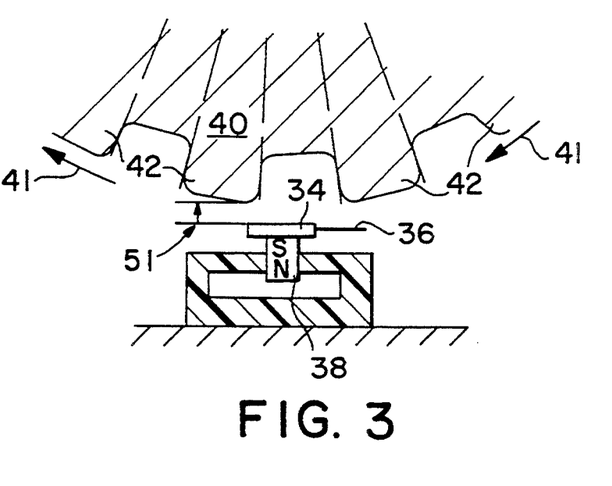
FIG. 3 shows a side view of a fixedly mounted Hall sensor of FIG. 1 with an adjacent rotating gear, illustrating an important use of slope-activated Hall sensors of this invention.

The Hall sensor circuit of FIG. 1 is encapsulated in a Hall sensor package 34 having radial leads 36 and attached to a magnet 38 as illustrated in FIG. 3. This sensor-magnet combination is fixedly mounted, while an iron gear 40 rotates in the direction of the arrows 41 so that the gear teeth 42 pass by adjacent to the Hall sensor package 34 with a small air gap 51 therebetween.

Figure 6:
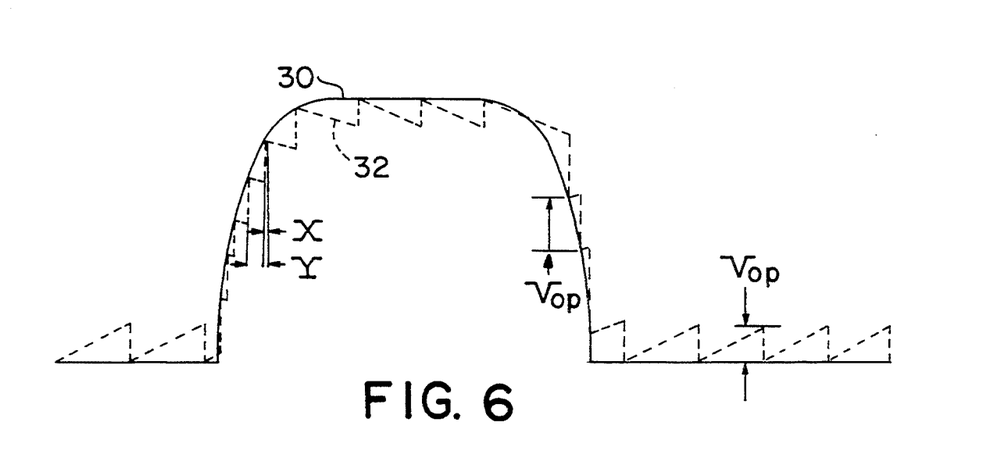
FIG. 6 shows the waveform 30 of the Hall voltage in the sensor of FIG. 1 at the output of the Hall-signal amplifier corresponding to the waveforms shown in FIGS. 4 and 5. Also shown superimposed on waveform 30 is the waveform 32 of the holding capacitor voltage Vc.
Figure 7:
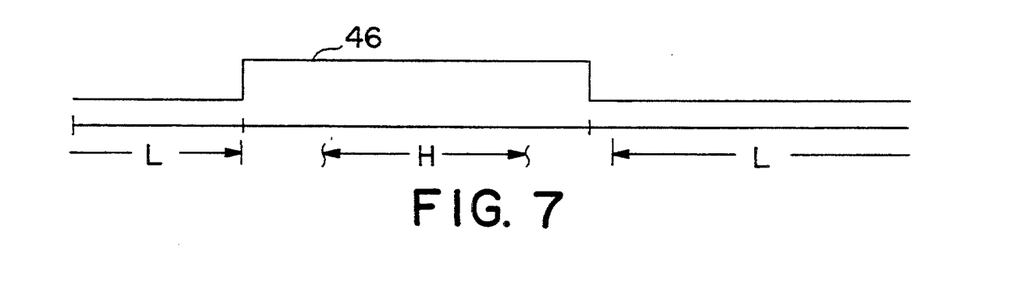
FIG. 7 shows the waveform 46 of the output of the Hall sensor of FIG. 1 corresponding to the waveforms of FIGS. 4, 5 and 6; the waveforms in these four FIGS. are drawn to the same time scale.

The Hall voltage $V_{aH}$ has a waveform 30 as shown in FIG. 6. When $V_{aH}$ is changing value, corresponding for example to the passage of the leading and falling edges of an adjacent gear tooth, the capacitor voltage Vc of waveform 32 follows, and thus tracks, the Hall voltage VaH of waveform 30.

The feedback from the outputs of the Schmitt trigger circuits 14 and 15 to the gates of FET switches 18 and 19 turns on a FET switch 18 or 19 each time the difference between $V_{aH}$ and Vc, namely voltage Vd, exceeds the threshold voltage $v_{op}$ of either Schmitt trigger circuit. This difference voltage thus always appears at the inputs of the two Schmitt trigger circuits during capacitor holding periods Y.

Figure 2:
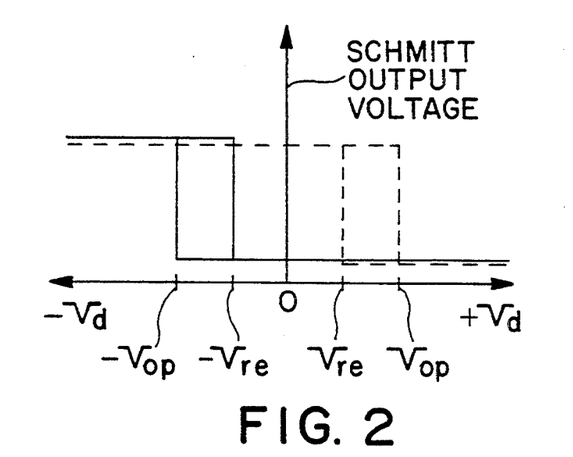
FIG. 2 shows superimposed the hysteresis loops for the pair of Schmitt trigger circuits employed in FIG. 1, namely a plot of the Schmitt circuit output voltages as a function of the differential inputs thereto.

Schmitt circuit 14 is operative when Vd is negative and Schmitt trigger 15 operates when Vd is positive. The Schmitt trigger differential operate and release threshold voltages $v_{op}$ and $v_{re}$ are shown in FIG. 2 wherein the left hand and right hand loops correspond respectively to Schmitt circuits 14 and 15. Thus switches 18 and 19 effect the enabling of the lower branch for a short capacitor-charging period each time the Hall signal begins to rise or fall.

When $V_{aH}$ continues to rise, the differential voltage Vd rises again from zero volts and upon exceeding again the operate threshold voltage $V_{op}$ of one of the Schmitt circuits, which initiates the next period of charging the holding capacitor 20 to the amplified Hall voltage $V_{aH}$, and again makes the differential input voltages Vd of the Schmitt trigger circuits zero.

Figure 4:
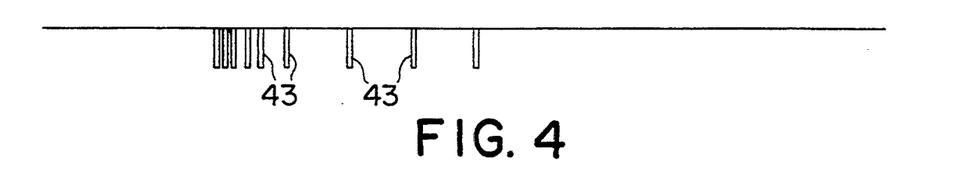
FIG. 4 shows the waveform 43 of the voltage at the output of the other of the two Schmitt trigger circuits in the slope-activated Hall sensor of FIG. 1.
Figure 5:
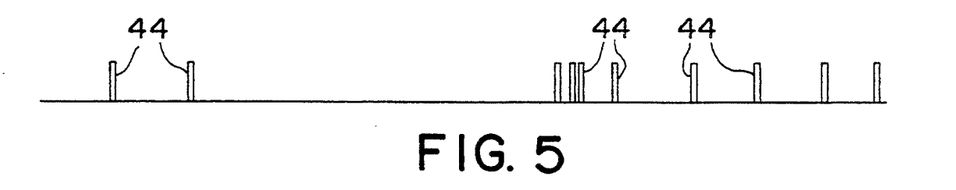
FIG. 5 shows the waveform 44 of the voltage at the output of the other of the two Schmitt trigger circuits in the slope-activated Hall sensor of FIG. 1.

The output signals from the two Schmitt circuits 14 and 15 are each composed of pulses 43 and 44, and are shown in FIGS. 4 and 5 respectively. The Schmitt circuit outputs are connected to the set and reset inputs of the flip flop 45, respectively. Since as shown in FIG. 4 each string of pulses from Schmitt trigger circuit 14 begins at trailing gear tooth edges, the flip flop 45 is set by the first of these pulses, and as shown in FIG. 5 each string of pulses from the Schmitt trigger circuit 15 begins at leading gear tooth edges, so flip flop 45 is reset by the first of these pulses. Thus the output of the flip flop 45 is a binary voltage having a waveform 46 which conforms substantially to the waveform 30 of the Hall voltage $V_{aH}$ and thus conforms to the profile of the teeth 42 the above-noted gear 40.

During the short period X, the holding capacitor 20 charges quickly to the Hall signal voltage whereby the input voltage at the differential inputs of each Schmitt trigger circuit 14 and 15 becomes zero. In the following interval Y the FET switches are open and the charged capacitor 20 holds the Hall voltage.

As a practical matter, however, the capacitor charge finds leakage paths in the capacitor 20 itself and in other associated circuit components. The leakage causes gradual reduction in capacitor voltage, or droop during periods X, as is illustrated in the waveform 32 of FIG. 6. Capacitor-voltage drop owing to leakage and loss of charge of capacitor 20 during holding periods is over compensated. The over compensating currents are provided by the current sources 47 and 49. Transistor 50 controls the direction of compensating current.

Transistor 50 is held off when the flip flop output is low, which corresponds to intervals when the capacitor 20 holds the voltage at a positive-going peak. In such positive-going peak intervals, the current I from current source 47, which is operative at all times, is designed to over-whelm the leakage. In negative-going peak intervals when the Hall voltage $V_{aH}$ is negative-going and the capacitor voltage Vc of capacitor 20 is charged to a negative-going peak voltage, the output from the flip flop 45 is high, and the transistor 50 is held on. In such intervals, the current source 49 supplies twice the current 2I as does the current source 47, so that a net current-source current (2I-I=I) provides similar overcompensation for negative-change leakage. The effect upon "droop" (during periods X) in the holding capacitor voltage Vc is seen in FIG. 6.

When power (Vcc) is first turned on to the Hall sensor of FIG. 1, the capacitor 20 having held no charge rises quickly and produces a false tripping of Schmitt trigger circuit 14 resulting in a false output at the output of the flip flop 45. This is prevented by the power-up reset circuit 29 whereby the one-shot circuit 31 senses the rise in supply voltage Vcc and produces a pulse that momentarily turns on transistor 33 to short the holding capacitor 20 long enough for the supply voltage to have reached its full value.

Figure 8:
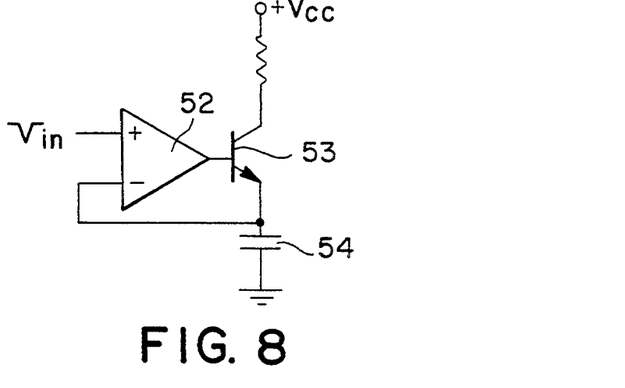
FIG. 8 shows a circuit diagram of a conventional active peak detector.

Turning now to the active peak detector of FIG. 8, when the input signal $V_{in}$ is a positive going pulse, the output of the amplifier 52 goes positive and turns on the NPN transistor 53 causing the voltage across the capacitor 54 to track the input voltage $V_{in}$ during the rising portion of the input pulse, and to hold the peak pulse voltage thereafter.

Figure 9:
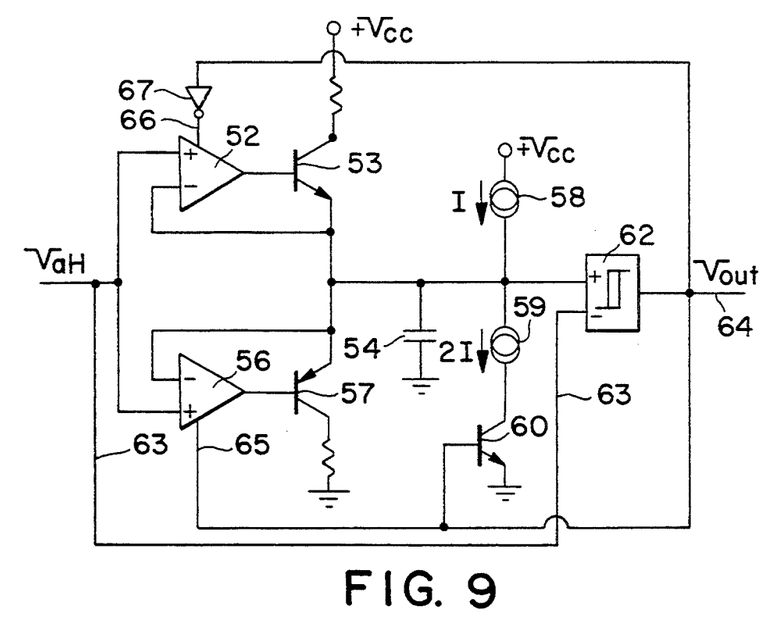
FIG. 9 shows a simplified circuit diagram of a second slope-activated Hall sensor of this invention, a dual-polarity track and hold circuit employing a pair of conventional active peak detectors of the kind shown in FIG. 8.

The slope-activated Hall-voltage detector of FIG. 9 includes a dual-polarity track and hold peak detector, wherein the input Hall signal voltage $V_{aH}$ is applied to the positive-slope active peak detector of FIG. 8, and also to a complementary negative-slope active peak detector comprised of amplifier 56, transistor 57 and the same voltage-tracking-and-holding capacitor 54.

Current sources 58 and 59 in the detector of FIG. 9 supply appropriate currents to the capacitor 54 for compensating the leakage current from capacitor 54 in the same manner as do the current sources 47 and 49 in the Hall detector circuit of FIG. 9; and the transistor 60 in FIG. 1 serves to switch in and out the current source 59 as does the transistor 50 switch in and out the current source 49 in FIG. 1.

The input voltage $V_{aH}$ is applied to one differential input of the Schmitt trigger circuit 62 via the circuit branch comprised of the two track-and-hold circuits including capacitor 54. The input voltage $V_{aH}$ is also applied directly to the other differential input of the Schmitt circuit 62 via the conductor 63 which is considered here as another branch circuit. The binary output conductor 64 of the Hall-voltage detector circuit of FIG. 9, is the output of the Schmitt circuit 62. Output 64 is fed back to the transistor switch 60, directly to the enable-input 65 of amplifier 56 and to the enable input 66 of amplifier 52 via the binary-signal invertor 67.

The amplifiers 52 and 56 have common inputs and are enabled only when they are needed. A differential Schmitt trigger circuit with hysteresis $V_H$ can alternately enable the appropriate peak detector so that transistor switch 53 is on and switch 57 is off during positive-going Hall voltage, and during negative-going Hall voltage $V_{aH}$ the transistor switch 57 is on and switch 53 is off.

During a positive going Hall voltage, the amplifier 52 is on and switch 53 on, keeping the voltage Vc across the holding capacitor 54 about equal to the Hall input voltage $V_{aH}$. When $V_{aH}$ becomes negative going and falls by more than $V_{op}$, the Schmitt trips disabling amplifier 52 and turning off transistor 53, while enabling amplifier 56 and turning on the PNP transistor 57. The capacitor voltage discharges and tracks $V_{aH}$ until it becomes positive-going again. At this time the Schmitt trips back and the cycle repeats for each following pulse. When used for gear tooth sensing, the binary output voltage $V_{out}$ is high and low corresponding to the passing of a gear tooth and to the passing of a "valley" between gear teeth.

Figure 10:
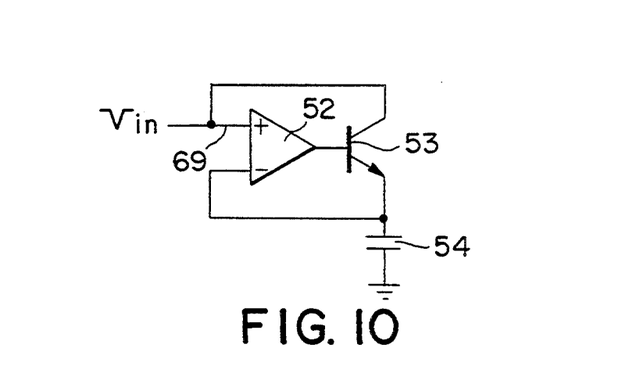
FIG. 10 shows a circuit diagram of an active peak detector having improved performance as a track-and-hold circuit for use in a slope-activated Hall sensor of this invention.
Figure 11:
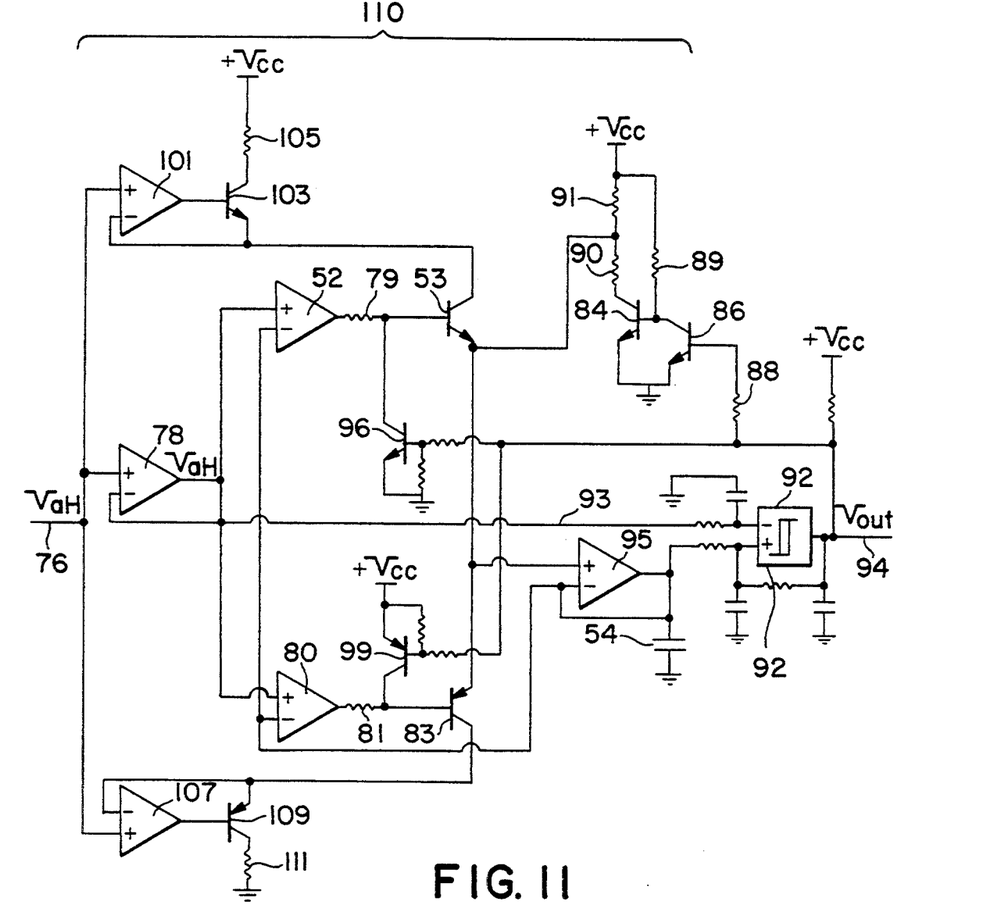
FIG. 11 shows a second slope-activated Hall sensor of this invention having a dual-polarity track and hold circuit employing a pair of novel peak detectors of the kind shown in FIG. 10.

Improvement in stability is obtained using the slope-activated Hall sensor of FIG. 11 wherein instead of using as in FIG. 9 the track-and-hold circuits of the kind shown in FIG. 8, the track-and-hold circuits of the kind shown in FIG. 10 are used.

In the slope-activated Hall-voltage detector of FIG. 11, the Hall voltage $V_{aH}$ is introduced at input conductor 76 to the input of voltage-follower amplifier 78. The Hall signal voltage $V_{aH}$ is applied to the positive-going track-and-hold circuit of FIG. 10 that is modified by addition of a resistor 79.

The Hall signal voltage $V_{aH}$ is also applied to a negative-going track-and-hold circuit comprised of amplifier 80, resistor 81, transistor 83 and the same voltage-tracking-and-holding capacitor 54. The leakage compensation circuit is comprised of Darlington connected transistor switches 84 and 86 and resistors 88, 89, 90 and 91.

In the Hall sensor of FIG. 11, the input voltage $V_{aH}$ is applied directly to one differential input of the Schmitt trigger circuit 92 via the circuit branch comprised of the two track-and-hold circuits including the voltage-follower amplifier 95 and the holding capacitor 54. Voltage-follower amplifier 95 is added to provide a low impedance source of holding-capacitor charging current, and thus reduce charging time. The input voltage $V_{aH}$ is also applied directly to the other differential input of the Schmitt circuit 92 via the conductor 93 which is considered here as another branch circuit. The binary output conductor 94 of the Hall-voltage detector circuit of FIG. 11 is the output of the Schmitt circuit 92. Output voltage $V_{out}$ from conductor 94 is fed back via transistor 96 to the base of transistor 53 for, when $V_{out}$ is low, shutting off and disabling the associated positive-going track-and-hold circuit. Likewise $V_{out}$ is fed back via transistor 99 to the base of transistor 83 for, when $V_{out}$ is high, shutting off and disabling the associated negative-going track-and-hold circuit.

The active voltage follower circuit that includes amplifier 101, NPN transistor 103 and collector resistor 105 provides a low impedance clamp for $V_{aH}$ at the collector of track and hold transistor 53; likewise the active voltage follower circuit that includes amplifier 107, PNP transistor 109 and collector resistor 111 provides a low impedance clamp for $V_{aH}$ at the collector of track and hold transistor 83.

The track-and-hold circuit of FIG. 10 is identical to that of FIG. 8 except that the collector of transistor switch 53 is connected to the input signal conductor 69 of amplifier 52, and the input signal $V_{in}$ serves as the collector supply voltage.

Figure 12:
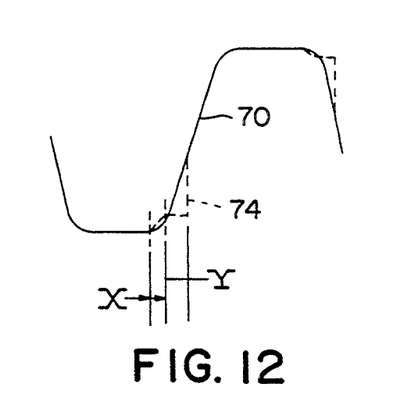
FIG. 12 shows a waveform 70 of the Hall detector voltage $V_{aH}$ and superimposed thereon a waveform 74 of the holding-capacitor voltage Vc in the Hall sensor of FIG. 11 that employs peak detectors of the kind shown in FIGS. 10.

The holding-capacitor voltage waveform 74 of FIG. 12 represents the smooth and more accurate performance of the novel active peak detector, of which a simple example is shown in FIG. 10, which performance improvement is attributable to the complementary pair of the novel peak detectors that are used in the Hall sensor of FIG. 11. A collector supply voltage for transistors 53 and 83 is at all times about equal to $V_{aH}$. The capacitor voltage (waveform 74) closely tracks the Hall voltage $V_{aH}$ (waveform 70) until $V_{aH}$ changes direction after a peak in waveform 70. At this point the peak signal voltage is held briefly until the signal voltage $V_{aH}$ has changed sufficiently to differ from the capacitor held voltage Vc by an amount equal to the hysteresis (+Vt or −Vt) of the Schmitt trigger circuit 92, at which time the Schmitt circuit is tripped and the binary output changes state.

By keeping the holding capacitor voltage Vc in such close track until the output switches, the track and hold circuit employed in the Hall sensor of FIG. 11 does not require the capacitor to hold the charge for the time between passing of two adjacent gear teeth, as would the AC coupled circuit of the Ramsden patent or other prior art circuits employing a high pass filter. And in the case that the "gear" is a cam with only one tooth, the capacitor is not required to hold the voltage Vc for a whole revolution of the cam. Instead the holding capacitor is required to hold the charge only for the time of passing of a tooth. This substantially reduces the size and the capacitance of the holding capacitor for a given minimum gear teeth passing rate.

The entire circuit shown in FIG. 11, with the exception of the Schmitt trigger circuit 92, is now seen to be a symmetrical dual-polarity track-and-hold circuit 110.

In a breadboard realization of the Hall sensor of FIG. 11, the minimum gear speed is 8.3 revolutions per minute at an air gap (e.g. 51 in FIG. 3) of 2 millimeters, and the capacitance of the holding capacitor 54 is 0.33 microfarads, about a tenth that needed in the single capacitor filter of the fore-mentioned Ramsden patent.

Figure 13:
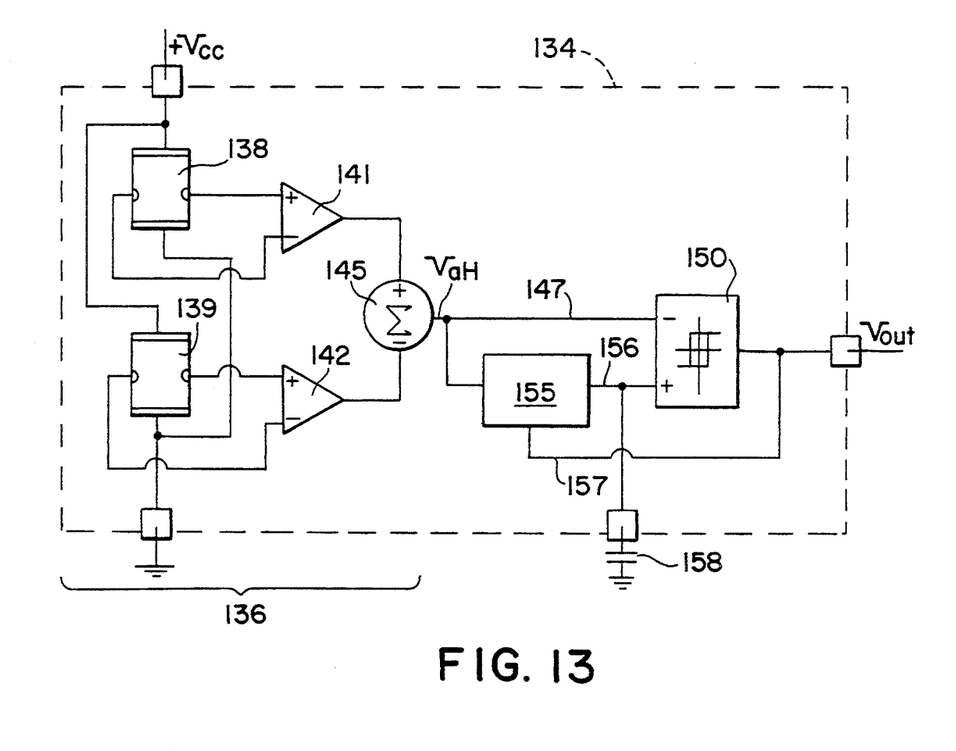
FIG. 13 shows a block diagram of a third slope-activated Hall sensor of this invention, having a dual-element Hall sensing device and having a dual-polarity track and hold circuit employing a pair of detectors of the kind shown in FIG. 10.

The integrated circuit Hall sensor 134 of FIG. 13 employs a dual-Hall-element magnetic-field detector 136 of the kind further described by R. Vig in his patent U.S. Pat. No. 5,045,920, issued Sep. 3, 1991 and assigned to the same assignee as is the present invention, and this patent is incorporated by reference herein for further describing the construction of such a dual Hall element detector.

Figure 16:
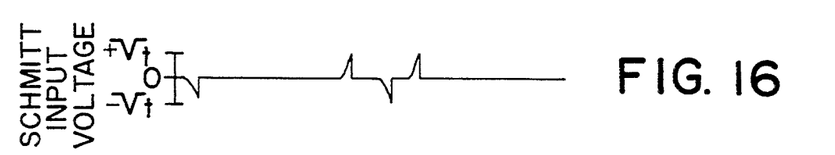
FIG. 16 shows a graph of the Schmitt circuit differential input voltage for the Hall sensor of FIG. 13.

In the Hall detector 136 the outputs respectively of the two Hall elements 138 and 139 are connected to the inputs of two linear Hall voltage amplifiers 141 and 142; and the outputs of amplifiers 141 and 142 are connected to the inputs of a subtract circuit 145. The output from subtract circuit 145, the source of Hall detector voltage $V_{aH}$, is connected directly via conductor 147 to the negative input of the differential symmetrical Schmitt trigger circuit 150 and is also connected to the input of the dual-polarity track-and-hold circuit 155. Track and hold circuit 155 may for example be identical to that (110) shown in FIG. 11. The output of circuit 155 is connected via conductor 156 to the positive input of the Schmitt circuit. The differential input voltage to the Schmitt trigger circuit 150 is shown in FIG. 16. The output of the Schmitt circuit serves as the output of the integrated Hall sensor and is also connected internally via conductor 157 to the track and hold circuit 155 for alternately enabling the two complementary-polarity peak detectors.

Figure 14:
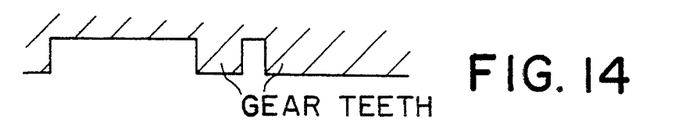
FIG. 14 shows the profile in cross section of a portion of a ferrous gear.

A circuit as shown in FIG. 13 was built and tested using a ferrous gear of 50 mm diameter and is illustrated in FIG. 14 having various teeth configurations, e.g. small and large teeth, and small and large tooth spacings. The spacing between the Hall elements 138 and 139 was 2.2 mm on centers. The gap between the Hall elements and the rotating gear teeth was 1 mm.

Figure 15:
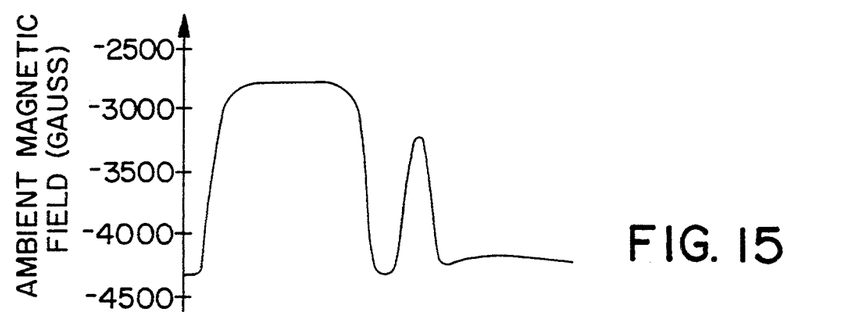
FIG. 15 shows a graph of magnetic field in one of the Hall elements in the Hall sensor of FIG. 13 as a function of degree of rotation of the gear in FIG. 14.
Figure 17A:
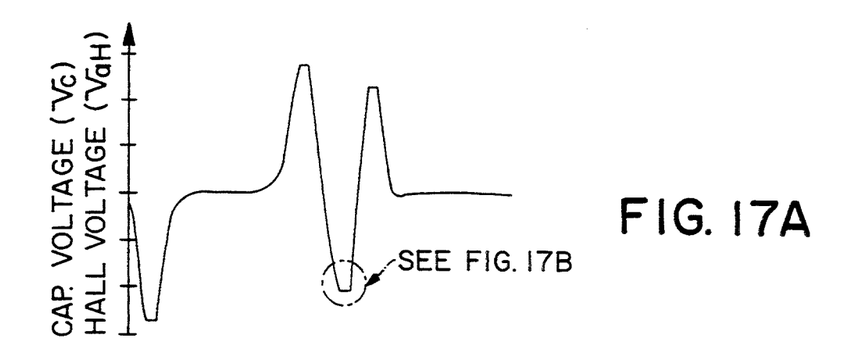
FIG. 17 shows a graph of Hall voltage $V_{aH}$ (dashed line) superimposed on the holding capacitor voltage Vc (solid line) in the Hall sensor of FIG. 13 as a function of angular rotation of the gear of FIG. 14.
Figure 17B:
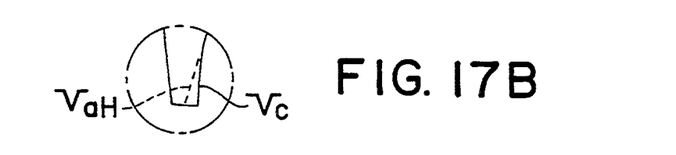
Figure 18:
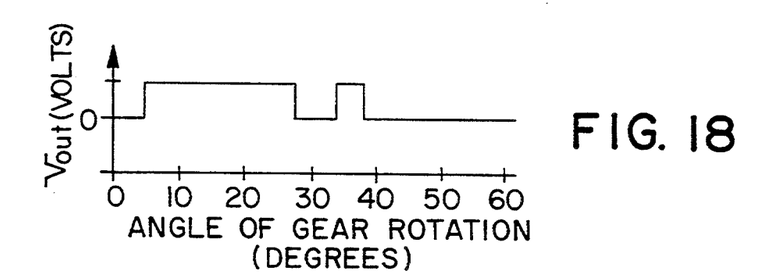

Under these conditions the difference in magnetic field, $\triangle G$, between the two Hall elements, i.e. the field gradient depicted in FIG. 15, is conservatively greater than that necessary for proper operation, namely greater than about 3 gauss per degree of gear rotation. The corresponding holding capacitor voltage Vc is shown in FIG. 17. The sensitivity of the Hall detector ($V_{aH}/\triangle G$) is 2 mv/$\triangle G$, and the symmetrical operate and release voltages of the Schmitt circuit 150 is 56 mv. Proper operation is indicated by the waveform of the output voltage Vout, FIG. 18, conforming to the profile of the passing gear teeth, FIG. 14. With a capacitance of the holding capacitor 158 at 0.33 microfarads, reliable operation was obtained for gear rotation speeds from 10 to 8000 r.p.m.

We claim:

1. A Hall-voltage slope-activated sensor comprising:
    a) a Hall detector including at least one Hall element;
    b) a comparator means having an output, and having one (147) and another (156) differential input conductors, for producing a binary output voltage that changes from one binary level to the other when the magnitude of the voltage appearing between said differential input conductors exceeds a predetermined magnitude;

c) a first circuit branch means, connected between the output of said Hall detector and said one comparator input conductor (147), for applying the Hall voltage at the output of said Hall detector to said one comparator input conductor (147); and d) a second circuit branch means connected between said Hall detector output and said another comparator input conductor (156), for tracking a slope of either polarity and holding the subsequent peak of the Hall voltage, and for applying the held peak voltage to said another comparator input conductor (156), so that when the Hall voltage begins to fall or rise, and the increasing difference between the Hall voltage and the held peak voltage exceeds said predetermined magnitude of said comparator and the ensuing comparator output pulse indicates the onset of a change in the strength of an ambient magnetic field at said Hall element.

2. The Hall sensor of claim 1 wherein said second circuit branch means is comprised of a symmetrical-dual-polarity track and hold circuit including a plus Hall-voltage tracking and holding circuit means having a voltage-holding capacitor for tracking positive slopes and holding positive-going portions of the Hall voltage, and a minus Hall-voltage tracking and holding circuit means including and sharing said voltage-holding capacitor for tracking negative slopes and holding negative-going portions of the Hall voltage.

3. The Hall sensor of claim 2 wherein said comparator is a symmetrical-dual-polarity Schmitt trigger circuit having operate and release threshold voltages of opposite polarities and equal value, namely said predetermined value.

4. The Hall sensor of claim 3 wherein said plus and minus Hall-voltage tracking and holding circuit means are comprised of a bipolar transistor having an emitter connected to said voltage-holding capacitor, a differential operational amplifier having an output connected to the base of said transistor, said transistor emitter connected to the negative input of said amplifier, the positive input of said amplifier serving as the input of said each Hall voltage tracking and holding circuit means at which said Hall voltage is to be applied.

5. The Hall sensor of claim 4 wherein the collector of said bipolar transistor is connected to said positive input of said operational amplifier in said each holding and tracking circuit means.

6. The Hall sensor of claim 3 wherein said Hall sensor being formed in an integrated circuit chip, and wherein said Hall detector comprises two essentially identical Hall elements and a subtractor means having two inputs connected respectively to the outputs of said two Hall elements, and having an output serving as said Hall detector output for generating the Hall voltage that is proportional to the difference between the output voltages of said two Hall elements.

7. The Hall sensor of claim 6 wherein said difference voltage circuit means comprises two Hall-voltage amplifiers each having an input connected to the output respectively of one and the other of said Hall elements, wherein said subtractor means is connected to the outputs of said Hall-voltage amplifiers for more particularly producing the Hall voltage that is the difference between the voltages appearing respectively at the outputs of said two Hall-voltage amplifiers.

8. The sensor of claim 1 wherein said first circuit branch means consists of said one comparator input conductor so that said output of said Hall detector is directly connected to said comparator via said first branch.

9. A slope-activated sensor comprising:

a) a magnetic-field detector including a magnetic-field to voltage transducer;

b) a comparator means having an output and having one and another input conductors, for producing a binary output voltage that changes from one binary level to the other when the magnitude of the voltage appearing at said comparator input exceeds a predetermined magnitude;

c) a first circuit branch means, connected between the output of said detector and said one comparator input conductor, for applying the detector voltage to said one comparator input conductor; and d) a second circuit branch means connected between said detector output and said another comparator input conductor, for tracking a slope of either polarity and holding the subsequent peak detector output voltage, and for applying the held peak voltage to said another comparator input conductor, so that during said holding, when the increasing difference between the detector output voltage and the held peak voltage exceeds said predetermined magnitude of said comparator, the ensuing change in the comparator output voltage from one binary level to the other indicates the onset of a change in the strength of an ambient magnetic field at said magnetic-field to voltage transducer.

10. A Hall-voltage slope-activated gear-tooth sensor comprising:

a) Hall element;

b) a magnet having a pole end to which said Hall element is mounted c) a Hall-voltage amplifier connected to the output of said Hall-element;

d) a symmetrical differential Schmitt trigger circuit having threshold voltages of opposite polarities and equal values, said Schmitt trigger circuit having first and second input conductors corresponding respectively to said one polarity and the other polarity;

e) a first circuit branch, connected directly between the output of said amplifier and said first input conductor; and f) a second circuit branch connected to the output of said Schmitt trigger circuit, and connected between said amplifier output and said second Schmitt input conductor, said second circuit branch composed of a dual-polarity track-and-hold circuit comprising first and second tracking and holding circuit means said first tracking and holding circuit means for tracking the Hall voltage during each period when the slope of the Hall voltage is positive and for holding the Hall voltage at positive-going peaks until the Hall voltage begins to fall and the voltage difference between said first and second Schmitt conductors reaches a threshold voltage of said Schmitt circuit, to trigger said Schmitt circuit and generate a binary output pulse at the one level that disables said first and enables said second tracking and holding circuit means, and said second tracking and holding circuit means for tracking the Hall voltage during each period when the slope of the Hall voltage is negative and for holding the Hall voltage at negative-going peaks until the Hall voltage begins to rise and the voltage difference between said first and second Schmitt conductors reaches a threshold voltage of said Schmitt circuit, to trigger said Schmitt circuit and generate a binary output pulse at the other level that disables said second and enables said first tracking and holding circuit means, so that when the teeth of a ferrous gear passes by said Hall element, the Schmitt output voltage has a waveform that corresponds in time to the profile of the teeth of the passing gear teeth.

* * * * *